US012732321B2

(12) United States Patent
Mei et al.

(10) Patent No.: US 12,732,321 B2
(45) Date of Patent: Sep. 8, 2026

(54) INFORMATION INDICATION METHOD, INFORMATION DETERMINING METHOD, COMMUNICATION NODE, TERMINAL, AND MEDIUM

(71) Applicant: ZTE CORPORATION, Shenzhen (CN)

(72) Inventors: Meng Mei, Shenzhen (CN); Zhaohua Lu, Shenzhen (CN); Chuangxin Jiang, Shenzhen (CN); Bo Gao, Shenzhen (CN); Shujuan Zhang, Shenzhen (CN); Ke Yao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 454 days.

(21) Appl. No.: 17/922,525

(22) PCT Filed: Apr. 29, 2021

(86) PCT No.: PCT/CN2021/090865
§ 371 (c)(1),
(2) Date: Oct. 31, 2022

(87) PCT Pub. No.: WO2021/219060
PCT Pub. Date: Nov. 4, 2021

(65) Prior Publication Data

US 2023/0171065 A1 Jun. 1, 2023

(30) Foreign Application Priority Data

Apr. 29, 2020 (CN) ......................... 202010358047.0

(51) Int. Cl.

| | |
|---|---|
| ***H04L 5/00*** | (2006.01) |
| ***H04B 7/024*** | (2017.01) |
| ***H04B 7/06*** | (2006.01) |

(52) U.S. Cl.
CPC .......... *H04L 5/0051* (2013.01); *H04B 7/024* (2013.01); *H04B 7/06968* (2023.05)

(58) Field of Classification Search
None
See application file for complete search history.

(56) References Cited

U.S. PATENT DOCUMENTS

| | | | | |
|---|---|---|---|---|
| 10,742,303 | B1 * | 8/2020 | Nilsson | H04B 7/063 |
| 2019/0222274 | A1 * | 7/2019 | Dou | H04B 7/0413 |

(Continued)

FOREIGN PATENT DOCUMENTS

| | | |
|---|---|---|
| CN | 109150467 A | 1/2019 |
| CN | 110535605 A | 12/2019 |

(Continued)

OTHER PUBLICATIONS

Indian Office Action for Application No. 202227068156, dated Mar. 15, 2023, 6 pages.

(Continued)

*Primary Examiner* — Abdullahi Ahmed
*Assistant Examiner* — Ahmed Saifuddin
(74) *Attorney, Agent, or Firm* — Morgan, Lewis & Bockius LLP

(57) ABSTRACT

Provided are an information indication method, an information determining method, a carrier frequency information determining method, a communication node, a terminal and a medium. The information indication method includes: determining a correspondence between a target antenna port and X antenna ports, where X is an integer greater than 1; and sending indication information to a terminal according to the correspondence, where the indication information is used for indicating that channel information of the target antenna port is obtained by combining channel information of the X antenna ports.

14 Claims, 5 Drawing Sheets

(56) References Cited

U.S. PATENT DOCUMENTS

2020/0076648 A1 3/2020 Li et al.
2021/0007091 A1* 1/2021 Frenne .................. H04W 72/23
2021/0391899 A1* 12/2021 Cao .................... H04B 7/06968
2022/0248385 A1* 8/2022 Cha ....................... H04L 5/0094
2022/0272674 A1* 8/2022 Go ....................... H04B 7/0691
2022/0330069 A1* 10/2022 Zhang ................... H04L 5/0051
2023/0239103 A1* 7/2023 Ji .......................... H04L 5/0094
2023/0344575 A1* 10/2023 Manolakos ............ H04B 7/022

FOREIGN PATENT DOCUMENTS

CN 110603871 A 12/2019
CN 111901086 A 11/2020
WO WO-2014020580 A1 2/2014
WO WO-2017048178 A1 3/2017
WO WO2018201495 A1 * 11/2018 ............ H04W 72/04
WO WO2019158186 A1 8/2019
WO WO-2020056180 A1 3/2020

OTHER PUBLICATIONS

International Search Report in Application No. PCT/CN2021/090865, dated Jul. 22, 2021, 44 pages, including English translation.
Interdigital, Inc., "Remaining issues on beam management", 3GPP TSG RAN WG1 Meeting #91, R1-1720630, Nov. 27-Dec. 1, 2017, Reno, NV, 13 pages.
Office Action in Chinese Application No. 202010358047.0, dated May 20, 2024, 12 pages including translation.
Search Report in Chinese Application No. 202010358047.0, dated May 14, 2024, 4 pages including translation.
Office Action in Canadian Application No. 3,177,325, dated May 7, 2024, 4 pages.
Extended European Search Report in Application No. 21797066.4, dated May 15, 2024, 7 pages.

* cited by examiner

Determine a correspondence between a target antenna port and X antenna ports, where X is an integer greater than 1 — 110

Send indication information to a UE according to the correspondence, where the indication information is used for indicating that channel information of the target antenna port is obtained by combining channel information of the X antenna ports — 120

FIG. 1

Target antenna port 0

Antenna port 1

Antenna port 2

INFORMATION INDICATION METHOD, INFORMATION DETERMINING METHOD, COMMUNICATION NODE, TERMINAL, AND MEDIUM

CROSS REFERENCE TO RELATED APPLICATIONS

This is a national stage application filed under 37 U.S.C. 371 based on International Patent Application No. PCT/CN 2021/090865, filed Apr. 29, 2021, which claims priority to Chinese Patent Application No. 202010358047.0 filed Apr. 29, 2020, the disclosures of which are incorporated herein by reference in their entireties.

TECHNICAL FIELD

The present application relates to wireless communication networks, and for example, to an information indication method, an information determining method, a carrier frequency information determining method, a communication node, a terminal and a medium.

BACKGROUND

In a new radio (NR) technology, channel characteristics corresponding to one antenna port may be inferred from channel characteristics corresponding to another antenna port, in this case, the two antenna ports have a quasi-co-located (QCL) relationship. However, as communication services increase, wireless network environments become more and more complex, and a number of antenna ports increases, as well as that a relationship between the antenna ports becomes more and more complex. If for one antenna port, there are no other antenna ports having a QCL relationship with it, the channel characteristics of this antenna port cannot be inferred. Especially in a case where multiple antenna ports exist, due to lack of a mechanism for clearly indicating or determining channel information, it becomes more difficult to determine the channel information of the antenna ports, which affects the data transmission, the data demodulation or the like, resulting in a lower reliability of a data transmission on a channel.

SUMMARY

The present application provides an information indication method, an information determining method, a carrier frequency information determining method, a communication node, a terminal and a medium, which realizes the accurate determination of the channel information and improve the reliability of a data transmission on a channel, by indicating that the channel information is obtained in a combination manner.

Embodiments of the present application provide an information indication method applied to a serving node, and the information indication method includes that: a correspondence between a target antenna port and X antenna ports is determined, where X is an integer greater than 1; and indication information is sent to a terminal (e.g., User equipment, UE) according to the correspondence, where the indication information is used for indicating that channel information of the target antenna port is obtained by combining channel information of the X antenna ports.

The embodiments of the present application further provide an information determining method applied to a terminal, and the information determining method includes that: indication information is received, where the indication information is used for indicating that channel information of a target antenna port is obtained by combining channel information of X antenna ports, and X is an integer greater than 1; and the channel information of the target antenna port is determined according to the indication information.

The embodiments of the present application further provide a carrier frequency information determining method applied to a serving node, and the carrier frequency information determining method includes that: resource indication information is sent to a terminal, where the resource indication information includes an association relationship between a sounding reference signal (SRS) resource and a downlink reference signal resource, and uplink carrier frequency information of the SRS resource and path loss information of the SRS resource are obtained according to the downlink reference signal resource; and uplink data sent based on the SRS resource is received.

The embodiments of the present application further provide a carrier frequency information determining method applied to a terminal, and the carrier frequency information determining method includes that: resource indication information is acquired, where the resource indication information includes an association relationship between a sounding reference signal (SRS) resource and a downlink reference signal resource, and uplink carrier frequency information of the SRS resource and path loss information of the SRS resource are obtained according to the downlink reference signal resource; and uplink data is sent based on the SRS resource.

The embodiments of the present application further provide a communication node, and the communication node includes one or more processors and a storage device. The storage device is configured to store one or more programs, and the one or more programs, when executed by the one or more processors, cause the one or more processors to implement the information indication method or the carrier frequency information determining method applied to the serving node.

The embodiments of the present application further provide a non-transitory computer-readable storage medium. The computer-readable storage medium stores a computer program, the computer program, when executed by a processor, implements the information indication method or the information determining method or the carrier frequency information determining method described above.

The embodiments of the present application further provide a computer-readable storage medium. The computer-readable storage medium stores a computer program, the computer program, when executed by a processor, implements the information indication method or the information determining method or the carrier frequency information determining method described above.

BRIEF DESCRIPTION OF DRAWINGS

FIG. 1 is a flowchart of an information indication method provided in an embodiment;

FIG. 2 is a schematic diagram of combining channel information provided in an embodiment;

DETAILED DESCRIPTION

Figure 3:
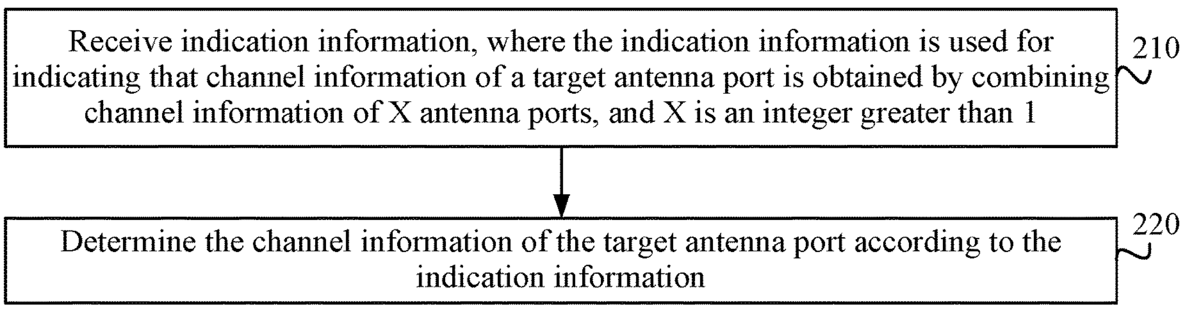
FIG. 3 is a flowchart of an information determining method provided in an embodiment.

The present application will be described in conjunction with the drawings and embodiments below. It should be understood that the specific embodiments described herein are merely used for explaining the present application and are not intended to limit the present application. It should be noted that the embodiments and features of the embodiments in the present application may be arbitrarily combined with each other without conflict. It should also be noted that, for ease of description, only some, but not all, of the structures related to the present disclosure are shown in the drawings.

In an NR system, when channel characteristics corresponding to one antenna port may be inferred from channel characteristics corresponding to another antenna port, the two antenna ports have a QCL relationship. In a case where two antenna ports have the QCL relationship, when a receiving end (a terminal) demodulates channel characteristics corresponding to one antenna port, the receiving end may use channel information corresponding to other antenna ports having a QCL relationship with the one antenna port according to the QCL relationship therebetween. However, as communication services increase, wireless network environments become more and more complex, and the number of antenna ports increases, a relationship between the antenna ports becomes more and more complex, if there are no other antenna ports having the QCL relationship with one antenna port, channel information corresponding to the one antenna port cannot be obtained from the channel information of other antenna ports through the QCL relationship, which may affects the reliability of a data transmission on a channel.

In an embodiment of the present application, an information indication method is provided and is applied to a serving node, and the serving node is, for example, a base station. The serving node sends indication information to indicate to the terminal that channel information of a target antenna port may be obtained by combining channel information of other X antenna ports, so that a reliable basis is provided for determining the channel information of the target antenna port, the channel information can be determined more flexibly, and the reliability of the data transmission on the channel is improved.

FIG. 1 is a flowchart of an information indication method provided in an embodiment, and as shown in FIG. 1, the method provided in this embodiment includes operation 110 and operation 120.

In operation 110, a correspondence between a target antenna port and X antenna ports is determined, where X is an integer greater than 1.

In operation 120, indication information is sent to a terminal according to the correspondence, where the indication information is used for indicating that channel information of the target antenna port is obtained by combining channel information of the X antenna ports.

In this embodiment, channel information of one channel may be obtained by combining channel information of other X channels, that is, the channel information of the target antenna port may be derived based on a manner of combining the channel information of the corresponding X antenna ports. Most of combined information of the channel information of the target antenna port and the channel information of other X antenna ports is the same or similar, and in this case, the combined information of the target antenna port and the other X antenna ports may be considered to be QCL. It should be noted that the channel information of the target antenna port and the channel information of the X antenna ports do not have an independent QCL relationship, and if the channel information of the X antenna ports is not combined, then the channel information of the target antenna port cannot be directly obtained by the channel information of the X antenna ports. The channel information of the target antenna port is determined according to a combination result of the channel information of the X antenna ports, so that the complexity and signaling overhead of a channel demodulation may be reduced to a certain extent. In all embodiments below, the described antenna ports may be also understood as ports for reference signals.

Since the channel information of the target antenna port may be obtained by combining the channel information of the corresponding X antenna ports, at a receiving end, the channel state of the target antenna port may utilize known channel states of the other X antenna ports to assist a demodulation. The channel information in this embodiment may include a delay spread, a Doppler spread, a Doppler shift, an average gain, and/or an average delay and the like of the channel. A serving node may indicate a correspondence (or QCL relationship) or the channel information combinable characteristic to the terminal, and on this basis, the terminal may combine the channel information of the X antenna ports according to the indication information to quickly obtain the channel information of the target antenna port.

FIG. 2 is a schematic diagram of combining channel information provided in an embodiment. This embodiment will be described by using as an example in which channel information of an antenna port is linearly combined according to a weight factor. As shown in FIG. 2, a target antenna port 0 may be obtained by combining channel information of X=2 antenna ports (an antenna port 1 and an antenna port 2), channel information of the antenna port 1 is denoted by $H_1$, and channel information of the antenna port 2 is denoted by Hz, then channel information of the target antenna port 0 may be denoted by $H_0=P_1*H_1+P_2*H_2$, where $P_1$ and $P_2$ are weight factors corresponding to the antenna port 1 and the antenna port 2, respectively. The serving node determines the QCL relationship between the target antenna port 0 and X antenna ports according to channel characteristics of the antenna ports (according to the same panel used by physical antennas, or the same sending beam used, or feedback information of the terminal), and then informs the terminal that channel characteristics of the target antenna port 0 may be determined by combining the other X antenna ports through signaling, for example, channels of the antenna port 1 and the antenna port 2 are combined to obtain a combined channel. The weight factor may be indicated by the serving node through signaling, for example, values of $P_1$ and $P_2$ or a proportionality coefficient may be configured by radio resource control (RRC) signaling, media access control-control element (MAC CE) signaling, or downlink control information (DCI) signaling. The method in this embodiment is also applicable in cases that a number of antenna ports that need to be combined (i.e., X) is greater than 2.

In some embodiments, the channel information of the antenna port may also be subjected to nonlinear combination, that is, the channel information of the X channels are not combined only by adjusting their respective coefficient ratios and adding them together; instead, the channel information of the X channels are combined by nonlinear functions with parameters which include some parameters of the channel (such as, power or amplitude of reference signals or data) indicated by the serving node or are parameters configured by the RRC signaling, the MAC CE signaling, or the DCI signaling.

The receiving end receives an indication of the QCL relationship between the target antenna port and the X antenna ports, and combines the channel information of the X antenna ports according to the QCL relationship, a combining manner indicated by the serving node, the weight factor, and the like, so as to obtain the channel information of the target antenna port.

In an embodiment, the X antenna ports needing to be combined may be from M serving nodes, where M is a positive integer. For example, in a case of M=1, all the X antenna ports are from a same serving node; and in a case where M is greater than 1, the X antenna ports are from different serving nodes.

In an embodiment, the target antenna port includes a target reference signal port; the X antenna ports include X reference signal ports, and the X reference signal ports correspond to X reference signal resources; channel information of the target reference signal port includes quasi-co-location parameters; and the indication information is used for indicating that the quasi-co-location parameters of the target reference signal port are obtained according to the X reference signal resources.

In this embodiment, the target antenna port or each the X antenna ports may be a reference signal port, and the channel information of the target antenna port may be the quasi-co-location parameters.

In an embodiment, the indication information is used for indicating that quasi-co-location parameters of a first channel corresponding to the target reference signal port are obtained according to quasi-co-location parameters of a second channel corresponding to the X reference signal resources.

In this embodiment, the first channel is a channel corresponding to the target reference signal port, the second channel is the second channel corresponding to the X reference signal resources, and quasi-co-location parameters of the first channel are obtained by combining quasi-co-location parameters of the second channel.

In an embodiment, a symbol for the target reference signal port is transmitted on the first channel.

In this embodiment, for some reference signals, such as a demodulation reference signal (DMRS), a tracking reference signal (TRS), a phase tracking reference signal (PTRS), a channel state indication reference signal (CSI-RS), the QCL relationship exists between the target reference signal port and the other X reference signal ports, and quasi-co-location parameters of the target reference signal port are obtained according to reference signal resources corresponding to the X reference signal ports. For example, the target reference signal port is a DMRS port, and the QCL relationship exists between combining information of the DMRS port and X CSI-RS ports or between combining information of the DMRS port and X antenna ports, so that the DMRS port may obtain information of a demodulation channel of the DMRS port by combining channel information of the X CSI-RS ports according to the QCL relationship, or may obtain channel information corresponding to the DMRS port according to the QCL relationship indicated by the serving node.

A TRS port is taken as an example. In order to track time offset and frequency offset of a link, a serving node configures a TRS, and for different TRSs, different time offsets and frequency offsets may be estimated. For a single frequency network (SFN) scenario, if one DMRS port and one TRS port have the QCL relationship, that is, some pieces of channel information of the DMRS port is the same as that of channel information of the TRS port, so that some pieces of channel information estimated according to the TRS port, such as a time offset and a frequency offset, may be used for a channel estimation of the DMRS port, and used for compensating for the time offset and the frequency offset in a process of data demodulation.

In a scenario of SFN, multiple transmission reception points (TRPs) may send the same data (including DMRS), and then as seen at the receiving end, due to different locations of different TRPs, time offsets and frequency offsets arriving at the receiving end are different. In case for a scenario of high-speed movement, different TRSs need to be configured to correct the frequency offset or the time offset, however if the QCL relationship exists for combined information of the DMRS port and different TRS ports of different TRPs, the channel information of the TRS ports of different TRPs, such as an estimated time offset and frequency offset, may be combined, and the combination may be performed according to sending power information of TRSs for different TRPs indicated by the serving node, or the combination may be performed at the terminal enabled by the serving node according to the obtained TRS powers corresponding to different TRPs, or the combination may be performed according to weight factors for combining the channel information of different TRS ports, where the weight factors are indicated by the serving node through DCI signaling. On this basis, the channel information obtained for different TRS ports corresponding to different TRPs may be combined, and the combined channel may be regarded as having the QCL relationship with a corresponding DMRS port in the scenario of SFN, that is, some pieces of channel information corresponding to this DMRS port may be obtained by combining the channel information corresponding to the TRS ports. The channel information may further include a Doppler shift, a delay spread, a Doppler spread, an average gain, and the like.

In an embodiment, each reference signal resource of the X reference signal resources corresponds to one channel; the second channel satisfies one of: the second channel includes a combined channel of X channels corresponding to the X reference signal resources; or the second channel includes a weighted combined channel of X channels corresponding to the X reference signal resources.

In this embodiment, the second channel is obtained by combining the X channels corresponding to the X reference signal resources, where the combination may refer to a non-linear combination, a linear combination, or a combination according to a predefined manner or a default manner, where for a case of the linear combination, each channel of the X channels corresponds to a respective weight factor.

In an embodiment, a symbol for a reference signal port corresponding to a respective reference signal resource is transmitted on a respective channel corresponding to the respective reference signal resource.

In an embodiment, in a case where the second channel includes the weighted combined channel of the X channels corresponding to the X reference signal resources, the second channel includes a combined channel obtained by multiplying each channel of the X channels by a respective weight factor and combining each channel multiplied by the respective factor. The respective weight factor corresponding to the each channel of the X channels is determined according to at least one of following information: first signaling, wherein the first signaling comprises the respective weight factor corresponding to the each channel of the X channels; a sending power ratio of the X channels corresponding to the X reference signal resources; a sending power ratio of the each reference signal resource of the X reference signal resources to a predetermined reference signal resource; or a sending power of the each reference signal resource of the X reference signal resources.

In this embodiment, in a case where the X channels corresponding to the X reference signal resources are subjected to a weighted combination, the weight factor of each channel may be determined according to multiple manners. For example, it may be determined according to the sending power ratio of any one of the X reference signal resources to the target reference signal port, the serving node may determine the sending power of the target reference signal port and the sending powers of the X reference signal resources, or energy per resource element (EPRE), respectively, and corresponding weight factors are given to sending powers of the X reference signal resources according to the ratio of the sending powers (or EPRE), and the weighted ratio of the sending powers of the X reference signals is used as a result of a channel combination. For example, in the scenario of SFN, where, in total, there are two reference signal ports as TRS ports, a ratio of sending powers corresponding to the two reference signal ports is 2:1, while a power ratio of data channels corresponding to the two TRS ports or a power ratio of DMRS (target reference signal) ports in the data channels is 1:1, a weighting is performed on the sending powers of the two TRS ports and the power ratio of the DMRS ports in the data channels. After the weighting is performed, the ratio of sending powers of the two TRS ports is the same as the power ratio of the corresponding data channels or is the same as the power ratio of the DMRS ports in the data channels, and in this case, a weighted ratio of the sending powers (which may be understood as the sending powers of the channels corresponding to the two reference signals) of the two TRS ports may be used as a weight factor of the channel combination.

For another example, the weight factor may be determined according to the sending power ratio of any one reference signal resource of the X reference signal resources to a predetermined reference signal resource. The weight factor may be determined by predetermining one reference signal resource (that is, one predetermined reference signal is selected from the X reference signal resources or from the other reference signals), and then determining a ratio of a sending power of each of the X reference signal resources to the sending power of the predetermined reference signal, respectively.

For another example, the weight factor may be determined according to a magnitude of the sending power of each reference signal resource of the X reference signal resources.

In this embodiment, the channel information of the target antenna port is obtained by weighting and combining the channel information of the X antenna ports, and the serving node may indicate the weight factors to the terminal through the RRC signaling, the MAC CE signaling, the DCI signaling and the like. For example, the serving node pre-configures a mapping relationship table or a calculation manner or configures a mapping relationship table or a calculation manner through RRC or MAC CE, which is related to a number of antenna ports needing to be combined or a bit number of DCI signaling. Taking a predefined mapping relationship table as an example, the mapping relationship table is used for describing weight factors of two antenna ports, and different weight factors may be selected (or one table is selected from multiple mapping relationship tables) according to different sending powers of the antenna ports or different configurations of serving nodes, and the selected weight factors are indicated through the DCI signaling.

TABLE 1

Mapping Relationship Table Between Two Antenna Ports and Weight factors

| DCI signal-ing | Weight factor for port 1 | Weight factor for port 2 | DCI signal-ing | Weight factor for port 1 | Weight factor for port 2 | DCI signal-ing | Weight factor for port 1 | Weight factor for port 2 |
|---|---|---|---|---|---|---|---|---|
| 0 | 1/4 | 3/4 | 0 | 1/8 | 7/8 | 0 | 1/16 | 15/16 |
| 1 | 2/4 | 2/4 | 1 | 2/8 | 6/8 | 1 | 2/16 | 14/16 |
| 2 | 3/4 | 1/4 | 2 | 3/8 | 58 | 2 | 3/16 | 13/16 |
| 3 | reserved | reserved | 3 | 4/8 | 4/8 | 3 | 4/16 | 12/16 |
| | | | 4 | 58 | 3/8 | 4 | 5/16 | 11/16 |
| | | | 5 | 6/8 | 2/8 | 5 | 6/16 | 10/16 |
| | | | 6 | 7/8 | 1/8 | 6 | 7/16 | 9/16 |
| | | | 7 | reserved | reserved | 7 | 8/16 | 8/16 |
| | | | | | | 8 | 9/16 | 7/16 |
| | | | | | | 9 | 10/16 | 6/16 |
| | | | | | | 10 | 11/16 | 5/16 |
| | | | | | | 11 | 12/16 | 4/16 |

TABLE 1-continued

Mapping Relationship Table Between Two Antenna Ports and Weight factors

| DCI signaling | Weight factor for port 1 | Weight factor for port 2 | DCI signaling | Weight factor for port 1 | Weight factor for port 2 | DCI signaling | Weight factor for port 1 | Weight factor for port 2 |
|---|---|---|---|---|---|---|---|---|
| | | | | | | 12 | 13/16 | 3/16 |
| | | | | | | 13 | 14/16 | 2/16 |
| | | | | | | 14 | 15/16 | 1/16 |
| | | | | | | 15 | reserved | reserved |

Table 1 is the mapping relationship table between the two antenna ports and the weight factors. As shown in table 1, if the channel information of the target antenna port may be determined by combining the channel information of the other two antenna ports, the serving node indicates a group of weight factors in table 1 through the DCI signaling according to factors such as powers of the two antenna ports needing to be combined, and the terminal may determine the weight factors according to the DCI signaling, and the channels of the two antenna ports are combined to obtain the channel information of the target antenna port. In some embodiments, for a case of a combination of channel information of more than two antenna ports, the weight factor may also be indicated through a mapping relationship table of each antenna port of more than two antenna ports and their respective weight factors, but for each value of the DCI signaling, the weight factors of more than two antenna ports need to be set.

In an embodiment, the quasi-co-location parameters includes at least one of: a channel large scale characteristic, an average gain, an average delay, a delay spread, a Doppler shift, a Doppler spread, or a spatial receiving parameter.

In an embodiment, the first signaling includes at least one of: RRC signaling; MAC CE signaling; or DCI signaling.

In this embodiment, the channel information of the X antenna ports is linearly combined. The weight factors of the linear combination may be configured by the serving node through first signaling, where the first signaling may be the RRC signaling, the MAC CE signaling, or the DCI signaling. In some embodiments, the serving node may also instruct the terminal how to acquire the weight factors through the RRC signaling or the MAC CE signaling or the DCI signaling by means of configuring acquisition manners of $P_1$ and $P_2$ through signaling. For example, the serving node may instruct the terminal how to acquire $P_1$ and $P_2$ by means of instructing different antenna ports to send data, or instructing powers of different antenna ports for sending reference signals, or the serving node may implicitly instruct the terminal how to acquire $P_1$ and $P_2$ by receiving powers of different reference signals received by the terminal. For example, in a case where the serving node instructs the terminal to determine the weight factors of the X channels through powers of different reference signals received by the receiving end, the terminal may calculate the powers of two received reference signals according to the two received reference signals (such as CSI-RS, TRS) from different antenna ports, and the terminal directly use the powers of the two received reference signals as $P_1$ and $P_2$ respectively or use the powers of the two received reference signals which are scaled with a certain proportion as $P_1$ and $P_2$ respectively. For a non-linear combination, X channels are not combined according to weight factors, the X channels may be combined through a non-linear function of parameters of some channels (such as, power or amplitude of reference signals or data) indicated by the serving node or a non-linear function of parameters configured by the serving node through the RRC signaling, the MAC CE signaling, or the DCI signaling.

In an embodiment, in a case where the second channel includes the weighted combined channel of the X channels corresponding to the X reference signal resources, the method further includes operation 111 in which, it is indicated that the second channel is obtained by weighting and combining a receiving power of each reference signal resource of the X reference signal resources.

In an embodiment, the reference signal includes at least one of: a demodulation reference signal, a tracking reference signal, a phase tracking reference signal, or a channel state indication reference signal.

In an embodiment, the method further includes operation 112 in which, a transmission configuration indication (TCI) state is predefined, where the TCI state is used for indicating that the DMRS port has a quasi-co-location relationship with combined information of channel information of multiple reference signals; and operation 113 in which, a reference signal having the quasi-co-location relationship with the DMRS port is indicated to the terminal through a TCI domain in DCI signaling.

In this embodiment, the serving node predefines a TCI state with the QCL relationship, and the TCI state includes that combining information containing multiple reference signals has the QCL relationship with the DMRS port. When the serving node indicates the QCL relationship, the serving node indicates the DMRS port having the QCL relationship with which reference signals through the TCI domain in the DCI signaling. Multiple states may be predefined, and then one target TCI state is selected from these states and indicated to the terminal through the TCI domain in the DCI signaling.

For some reference signals which do not have the QCL relationship with a DMRS port, some pieces of channel information of these reference signals cannot be used for demodulation of this DMRS. If these pieces of channel information of these reference signals are included in a predefined TCI state, that is, the combined information of some antenna ports (or reference signals corresponding to different antenna ports) has the QCL relationship with the DMRS, some pieces of channel information carried by these reference signals may be used for the demodulation of this DMRS.

For example, in the scenario of SFN, since the data transmitted by multiple TRPs is the same, but there may be certain reference signals (such as, CSI-RS, TRS, PL-RS) configured differently, and since DMRS ports used by multiple TRPs are also the same, a QCL relationship between the DMRS and the reference signals configured by a certain TRP (e.g., TRP1) is usually indicated, but since the data received by the UE is from different TRPs, the indicated QCL relationship described above may cause that channel information obtained by combining data sent by other TRPs and data sent by the TRP1 has a certain error. Therefore, if the channel combining information of several reference signals and the DMRS port are predefined to have the QCL relationship, the serving node indicates the above-described QCL relationship through the TCI, so that when the UE performs the DMRS demodulation, the channel combining information of the several reference signals may be obtained according to the indication of the TCI. Similarly, combining coefficients of some pieces of channel information among the respective reference signals may be indicated by the serving node to the UE or informed by the serving node to the UE in a default or predefined manner, and the UE may obtain the combining coefficient described above. For example, if the serving node indicates or informs in a default or predefined manner that the UE uses the receiving powers (or the proportional relation between the receiving powers) for receiving the several reference signals as the combining information of the channel information of the several reference signals; the UE obtains the above-described combining information by measuring the powers of the reference signals or the reference signal receiving powers (RSRPs) or the signal to noise ratio (SNR) or the signal to interference plus noise ratio (SINR), so that the channel combining information of the reference signals may be obtained. In such way, the serving node indicates that the channel combining information of the reference signals has the QCL relationship with the DMRS port, and the UE uses the channel combining information described above for a demodulation of the DMRS, whereby the reliability of data transmission and demodulation is improved.

According to the information indication method provided in this embodiment, the serving node may indicate a combination manner of the channel information and an acquisition manner of the weight factors of the antenna ports or the reference signal ports to the terminal through different signaling, and a setting manner of the weight factors is diversified and flexible, so that a reliable basis is provided for the terminal to determine the channel information of the target antenna port, so that the accurate determination of the channel information, the quasi-co-location parameters and the like is realized, and further the reliability of the data transmission on the channel is improved.

The information determining method is applied to the terminal in the embodiments of the present application, and the terminal is, for example, the UE. The terminal combines the channel information of the X antenna ports according to the indication information sent by the serving node to obtain the channel information of the target antenna port, so that the reliability of determining the channel information of the target antenna port is improved, the channel information is determined more flexibly, and further the reliability of the data transmission on the channel is improved. It should be noted that specific operations performed by the terminal in this embodiment correspond to specific operations performed by the serving node in any of the above-described embodiments, and technical details not described in detail in this embodiment may be referred to any of the above-described embodiments.

FIG. 3 is a flowchart of an information determining method provided in an embodiment, as shown in FIG. 3, the method includes operation 210 and operation 220.

In operation 210, indication information is received, where the indication information is used for indicating that channel information of a target antenna port is obtained by combining channel information of X antenna ports, and X is an integer greater than 1.

In operation 220, the channel information of the target antenna port is determined according to the indication information.

In this embodiment, information of one channel may be obtained by combining channel information of other X channels, that is, the channel information of the target antenna port may be derived based on a manner of combining the channel information of the corresponding X antenna ports. Most of combined information of the channel information of the target antenna port and the channel information of other X antenna ports is the same or similar, and in this case, the combined information of the target antenna port and the other X antenna ports may be considered to be QCL. The channel information of the target antenna port is determined according to a combination result of the channel information of the X antenna ports, so that the complexity and signaling overhead of a channel demodulation may be reduced to a certain extent.

In an embodiment, the X antenna ports may be from M serving nodes, where M is a positive integer. For example, in a case of M=1, X antenna ports needing to be combined all come from a same serving node; in a case where M is greater than 1, X antenna ports are from different serving nodes.

In an embodiment, the target antenna port includes a target reference signal port; the X antenna ports include X reference signal ports, and the X reference signal ports correspond to X reference signal resources; channel information of the target reference signal port includes quasi-co-location parameters; and the indication information is used for indicating that the quasi-co-location parameters of the target reference signal port are obtained according to the X reference signal resources.

In this embodiment, the target antenna port or the X antenna ports may be reference signal ports, and the channel information of the target antenna port may be the quasi-co-location parameters.

In an embodiment, the indication information is used for indicating that quasi-co-location parameters of a first channel corresponding to the target reference signal port are obtained according to quasi-co-location parameters of a second channel corresponding to the X reference signal resources.

In this embodiment, the first channel is a channel corresponding to the target reference signal port, the second channel is the second channel corresponding to the X reference signal resources, and quasi-co-location parameters of the first channel are obtained by combining quasi-co-location parameters of the second channel.

In an embodiment, a symbol for the target reference signal port is transmitted on the first channel; a symbol for a reference signal port corresponding to a respective reference signal resource is transmitted on a respective channel corresponding to the respective reference signal resource; each reference signal resource of the X reference signal resources corresponds to one channel; the second channel satisfies one of: the second channel includes a combined channel of X channels corresponding to the X reference signal resources; or, the second channel includes a weighted combined channel of X channels corresponding to the X reference signal resources.

In this embodiment, the second channel is obtained by combining the X channels corresponding to the X reference signal resources, where the combination may refer to a non-linear combination, a linear combination, or a combination according to a predefined manner or a default manner, where for a case of the linear combination, each channel of the X channels corresponds to a respective weight factor.

In an embodiment, the method further includes operation 211 in which, in a case where the second channel includes the weighted combined channel of the X channels corresponding to the X reference signal resources, the second channel includes a combined channel obtained by multiplying each channel of the X channels by a respective weight factor and combining each channel multiplied by the respective weight factor. The respective weight factor corresponding to the each channel of the X channels is determined according to at least one of following information: first signaling, wherein the first signaling comprises the respective weight factor corresponding to the each channel of the X channels; a sending power ratio of the X channels corresponding to the X reference signal resources; a sending power ratio of the each reference signal resource of the X reference signal resources to a predetermined reference signal resource; or a sending power of the each reference signal resource of the X reference signal resources.

In an embodiment, the method further includes operation 212 in which, an acquisition manner of the weight factor is determined through the first signaling, where the first signaling includes at least one of: RRC signaling, MAC CE signaling or DCI signaling; or an acquisition manner of the weight factor is determined in a predefined or default manner.

In an embodiment, the method further includes operation 213 in which, the second channel is obtained by weighting and combining a receiving power of each reference signal resource of the X reference signal resources.

In an embodiment, the quasi-co-location parameters includes at least one of: a channel large scale characteristic, an average gain, an average delay, a delay spread, a Doppler shift, a Doppler spread, or a spatial receiving parameter.

In an embodiment, the reference signal includes at least one of: a demodulation reference signal, a tracking reference signal, a phase tracking reference signal, or a channel state indication reference signal.

In an embodiment, the method further includes operation 214 in which, in a case where a predefined TCI state indicates that a DMRS port has a quasi-co-location relationship with combined information of channel information of multiple reference signals, DCI signaling is received, and a reference signal having the quasi-co-location relationship with the DMRS port is determined according to a TCI domain in the DCI signaling.

According to the information determining method provided in this embodiment, the serving node may indicate a combination manner of the channel information and an acquisition manner of the weight factor of the antenna port or the reference signal port to the terminal through different signaling, and a setting manner of the weight factors is diversified and flexible; therefore, the terminal combines the channel information of the antenna port so as to determine the channel information of the target antenna port, whereby the reliability and flexibility of determination of the channel information are improved, the accurate determination of the channel information, the quasi-co-location parameters and the like is realized, and further the reliability of the data transmission on the channel is improved.

For an uplink, the serving node configures a bandwidth part (BWP) for the terminal, and the terminal can obtain the uplink sending resource according to the scheduled BWP and other information, but the terminal cannot accurately obtain a central frequency point sent by an uplink modulation, and cannot determine a carrier frequency for sending the uplink modulation, which causes that an effective determination mechanism is needed for a scenario in which a center carrier frequency of the uplink sending needs to be obtained, how to obtain the carrier frequency information for sending the uplink modulation. Meanwhile, since the uplink SRS is indicated by a sounding reference signal resource indication (SRI) in an uplink transmission, and one SRI may indicate multiple SRS resources in the non-codebook-based transmission, so that the serving node cannot accurately and reliably obtain the uplink carrier frequency information according to the SRS information in some scenarios.

The carrier frequency information determining method is provided according to the embodiments of the present application, and the serving node sends resource indication information to the terminal to indicate the association relationship between the SRS resource and the downlink reference signal resource, so that the uplink carrier frequency information carried by the SRS resource is clear, and thus the reliability of determination of the carrier frequency information is improved.

Figure 4:
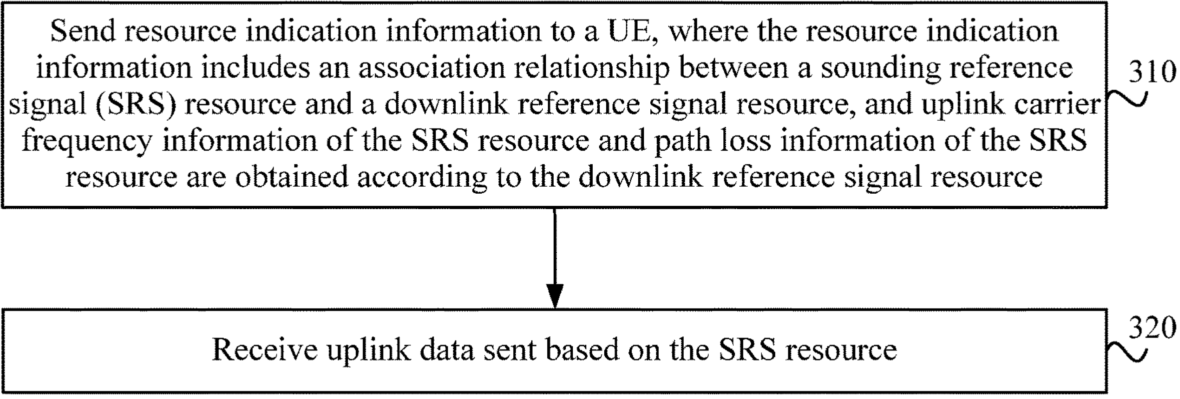
FIG. 4 is a flowchart of a carrier frequency information determining method provided in an embodiment.

FIG. 4 is a flowchart of a carrier frequency information determining method provided in an embodiment, as shown in FIG. 4, the method includes operation 310 and operation 320.

In operation 310, resource indication information is sent to a terminal, where the resource indication information includes an association relationship between a sounding reference signal (SRS) resource and a downlink reference signal resource, and uplink carrier frequency information of the SRS resource and path loss information of the SRS resource are obtained according to the downlink reference signal resource.

In this embodiment, a serving node indicates path loss information and uplink carrier frequency information used by the terminal to send uplink data and SRS resources through the association relationship. If the SRS resource is associated with a certain downlink reference signal or several downlink reference signals, the uplink carrier frequency information is obtained from the carrier frequency information carried by the reference signals or an offset to a position of a lowest subcarrier occupying a frequency domain resource (or an offset to an initial frequency domain position of a physical resource block or a BWP) or a frequency domain offset to a concentric frequency point.

In operation 320, uplink data sent based on the SRS resource is received.

In an embodiment, the method further includes operation 311 in which, a path loss reference signal is sent to the terminal, where the uplink carrier frequency information is carried in the path loss reference signal.

In this embodiment, the serving node indicates that carrier frequency information for sending the uplink modulation is carried in the SRS resource, and indicates that an uplink sending carrier frequency may be obtained through the path loss reference signal. The path loss reference signal is used for the terminal to calculate path loss information on a certain carrier frequency and is used for uplink power control. The terminal may obtain uplink carrier frequency information through the path loss reference signal in which the uplink carrier frequency information is carried, and may obtain a carrier frequency for sending the uplink modulation according to the uplink carrier frequency information carried in the path loss reference signal.

In an embodiment, the method further includes operation 312 in which, an association relationship is configured in a predefined or default manner, where the association relationship includes an association relationship between a port for sending the path loss reference signal and the SRS resource indicated by the resource indication information.

In this embodiment, the serving node configures, in a predefined or default manner, an association relationship between a path loss reference signal port and an SRS resource indicated through an SRI, or the serving node indicates an association relationship between a path loss reference signal port and an SRS resource indicated through the SRI through second signaling, and the second signaling includes at least one of RRC, MAC CE or DCI; the association relationship includes that the path loss reference signal port is associated with an SRS resource with a lowest identification in the SRS resources indicated through the SRI.

In an embodiment, for a codebook-based uplink transmission, the serving node sends an SRI, and the terminal may send uplink data using a corresponding SRS port according to the SRI of the serving node. In this case, the uplink sending carrier frequency of the SRS port indicated through the SRI may use uplink carrier frequency information obtained according to the path loss reference signal, and the uplink carrier frequency information may be carried according to the SRS resource indicated through the SRI, and the serving node obtains the uplink carrier frequency information according to SRS port information used by the terminal. The process therefor may be described as the following.

1) The serving node sends a path loss reference signal (PL-RS) or TRS based on uplink carrier frequency information (center carrier frequency f) to the terminal.
2) The terminal determines the SRS resource according to the SRI.
3) The terminal sends uplink data based on the SRS resource, where the SRS resource carries uplink carrier frequency information (f).

In this embodiment, for the non-codebook-based uplink transmission, the serving node determines, in a predefined manner, that an SRS port indicated through the SRI carries uplink carrier frequency information of an uplink modulation. An SRS resource with a lowest SRS resource port number in the SRI is predefined as the target SRS resources for carrying the uplink carrier frequency information described above. For example, in a case where there are only one SRS port in the SRS resources indicated through the SRI, the terminal may directly use the SRS port to carry the uplink carrier frequency information; in a case where more than one SRS port exists in the SRS resource indicated through the SRI, the terminal may select an SRS port with a lowest identifier from the more than one SRS port as the target SRS port. Table 2 shows a mapping relationship table of SRI indication values, SRS ports, and target SRS ports. As shown in table 2, $N_{SRS}$ denotes a total number of SRS ports or SRS resources, a case of $N_{SRS}$=2 is taken as an example, if an indicated value of an SRI bit field is 2, then two SRS ports, i.e. 0 and 1, are indicated, and an SRS port with a lowest port identifier, i.e. port identifier of 0, is used as the target SRS port to carry the uplink carrier frequency information.

In this embodiment, for the non-codebook-based uplink transmission, the serving node determines, in a predefined manner, that an SRS port indicated through the SRI carries uplink carrier frequency information of an uplink modulation. An SRS resource with a lowest SRS resource port number in the SRI is predefined as the target SRS resources for carrying the uplink carrier frequency information described above. For example, in a case where there are only one SRS port in the SRS resources indicated through the SRI, the terminal may directly use the SRS port to carry the uplink carrier frequency information; in a case where more than one SRS port exists in the SRS resource indicated through the SRI, the terminal may select an SRS port with a lowest identifier from the more than one SRS port as the target SRS port. Table 2 shows a mapping relationship table of SRI indication values, SRS ports, and target SRS ports. As shown in table 2, $N_{SRS}$ denotes a total number of SRS ports or SRS resources, a case of $N_{SRS}$=3 is taken as an example, if an indicated value of an SRI bit field is 3, then two SRS ports, i.e. 0 and 1, are indicated, and an SRS port with a lowest port identifier, i.e. port identifier of 0, is used as the target SRS port to carry the uplink carrier frequency information.

TABLE 2

Mapping Relationship Table of SRI Indication Values, SRS Ports, and Target SRS Ports

| SRI indication value in bit field | SRS port $N_{SRS}$ = 2 | Target SRS port | SRI indication value in bit field | SRS port $N_{SRS}$ = 3 | Target SRS port | SRI indication value in bit field | SRS port $N_{SRS}$ = 4 | Target SRS port |
|---|---|---|---|---|---|---|---|---|
| 0 | 0 | 0 | 0 | 0 | 0 | 0 | 0 | 0 |
| 1 | 1 | 1 | 1 | 1 | 1 | 1 | 1 | 1 |
| 2 | 0, 1 | 0 | 2 | 2 | 2 | 2 | 2 | 2 |
| 3 | reserved | reserved | 3 | 0, 1 | 0 | 3 | 3 | 3 |
| | | | 4 | 0, 2 | 0 | 4 | 0, 1 | 0 |
| | | | 5 | 1, 2 | 1 | 5 | 0, 2 | 0 |
| | | | 6 | 0, 1, 2 | 0 | 6 | 0, 3 | 0 |
| | | | 7 | reserved | reserved | 7 | 1, 2 | 1 |
| | | | | | | 8 | 1, 3 | 1 |
| | | | | | | 9 | 2, 3 | 2 |
| | | | | | | 10 | 0, 1, 2 | 0 |
| | | | | | | 11 | 0, 1, 3 | 0 |
| | | | | | | 12 | 0, 2, 3 | 0 |
| | | | | | | 13 | 1, 2, 3 | 1 |
| | | | | | | 14 | 0, 1, 2, 3 | 0 |
| | | | | | | 15 | reserved | reserved |

In an embodiment, for the non-codebook-based uplink transmission, the serving node indicates a target SRS resource carrying uplink carrier frequency information in multiple SRS resources indicated through an SRI through third signaling, and the third signaling includes at least one of: RRC signaling, MAC CE signaling or DCI signaling.

For the non-codebook-based uplink transmission, the serving node indicates which SRS port or which SRS ports are used for carrying the uplink carrier frequency information through fourth signaling. The serving node indicates uplink enabled SRS resources through the SRI, and table 2 is taken as an example. In case that a number of the uplink enabled SRS resources indicated through the SRI is 4, the SRI needs to indicate the uplink enabled SRS resources through 4-bit information. According to the correspondence, one SRI indicates multiple SRS resources for the uplink transmission. If the serving node carries the uplink carrier frequency information through a dynamic signaling indication, a fourth signaling, which is 2-bit at most, is needed to indicate which SRS port, among the SRS ports used for uplink and indicated in the SRI information, is used for carrying the uplink carrier frequency information. For example, when the SRI indicates 4 SRS resources, the terminal may use all the four SRS resources for uplink transmission according to the SRI, and in case that the fourth signaling is used for indication, the terminal may be indicated to use which SRS port, among the four SRS resources, as the target SRS port for carrying the uplink carrier frequency information for sending the uplink modulation.

In some embodiments, in a scenario of downlink SFN, since different TRPs send the same data and DMRS, data from different TRPs need to be received at the receiving end for demodulation. In this case, in case that the UE are moving with a relatively high speed, for example, in a high-speed train (HST), due to the high-speed movement of the UE (or a relatively large difference of frequency offsets loaded on different TRPs), Doppler frequency shifts or frequency offsets loaded on data sent by different TRPs are different, and due to the moving direction of the UE, the UE is located between different TRPs in the HST. It may be understood that the UE is moving close to one TRP while moving far away from another TRP, which causes a difference between a positive Doppler frequency shift and a negative Doppler frequency shift, that is, a larger difference between Doppler frequency shifts is introduced due to high-speed movement. In order to compensate for the frequency offset caused by the high-speed movement, a TRP needs to be configure with a TRS, but in the scenario of SFN, if only one TRS is configured for the TRP, the TRS may be a sending combination of two TRPs at the receiving end, and if this TRS is used for the estimation of the frequency offset, a large error may be caused. If 2 TRSs are configured (one TRS is independently configured for each TRP), the channel information of one antenna port at the receiving end may be obtained by combining the information of other antenna ports, that is, the channel of one TRS may be obtained by combining the channel information of the other two TRSs, and if the obtained frequency offset estimation is used for demodulation of the DMRS, a compensation to the Doppler frequency shift may be facilitated.

In a case where only one TRS exists, if the serving node wants to reduce the influence caused by the Doppler shift, the serving node needs to perform a pre-compensation at the sending end, and then needs to estimate respective approximate Doppler shifts. In this embodiment, the serving node may acquire the uplink carrier frequency information by receiving the SRS resource carrying the uplink carrier frequency information, and on the basis, the serving node may obtain a downlink frequency offset roughly estimated according to a carrier frequency for downlink sending and a received carrier frequency for uplink sending of the terminal. The serving node may configure a target SRS port for carrying uplink carrier frequency information, that is, downlink carrier frequency information carried by PL-RS or TRS is used for a certain uplink SRS port or several uplink SRS ports.

In some embodiments, all SRS resources may be used for carrying uplink carrier frequency information, i.e., uplink carrier frequency information obtained by the terminal from a TRS or a PL-RS, when an uplink SRS is sent, each SRS port carries the uplink carrier frequency information, i.e., all uplink data and reference signals are sent based on the carrier frequency, and in a frequency range (FR) 1 (i.e., FR1), the probability of using beams in a scenario of HST is relatively low, and therefore, in an uplink transmission of multiple SRS resources, if the uplink carrier frequency information obtained by receiving each SRS resource by the serving node has little difference, the serving node may obtain the frequency offset by utilizing the uplink carrier frequency information obtained by the received multiple SRS resources, and in this case, a relatively accurate frequency offset estimation may be realized for the codebook based uplink transmission and the non-codebook-based uplink transmission.

In an FR2, due to a fact that the modulated carrier frequency is relatively high, the performance of an uplink and a downlink is improved by using a beam in the FR2. If the carrier frequencies of different uplink SRS resources received by the serving node have a certain difference due to a reason of the beams, particularly in the non-codebook-based uplink transmission, one SRI may indicate multiple SRS resources to perform an uplink transmission, the serving node may obtain different carrier frequencies from the carrier frequency information carried by the SRS port, so that the serving node may determine the uplink carrier frequency information of multiple uplink SRSs in a predefined manner or a default manner, and the serving node may also acquire appropriate uplink carrier frequency information by selecting uplink carrier frequency information of a certain target SRS resource or certain target SRS resources, or by combining the obtained uplink channel information in some combination manners.

In a scenario of SFN with multi-TRP, the PTRS needs to be used for a phase noise compensation in a case where the carrier frequency is relatively high and the modulation mode level is relatively high, but the phase noise is relatively different due to sending performed by different TRPs, the configured PTRS needs to compensate the phase noise of the multiple TRPs/panels.

Figure 5:
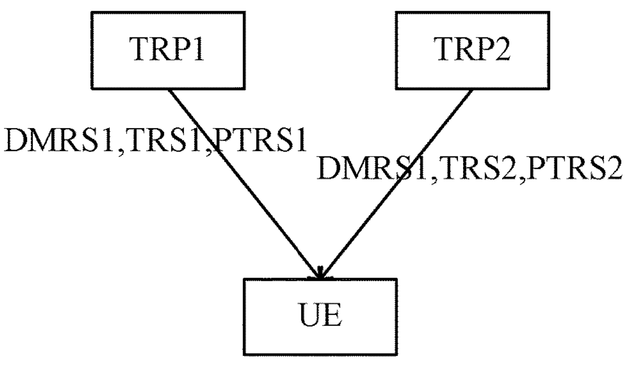
FIG. 5 is a schematic diagram of configuring a phase tracking reference signal provided in an embodiment.

In an embodiment, the serving node configures Y PTRS for Y TRPs, where Y is a positive integer. FIG. 5 is a schematic diagram of configuring a phase tracking reference signal provided in an embodiment. As shown in FIG. 5, respective PTRSs are configured for different TRPs.

In Rel-15, a power difference between PTRS and DMRS is related to the number of layers of DMRS. That is, the power of the PTRS is L times of that of a physical downlink shared channel (PDSCH), and L is the number of layers. But in the scenario of SFN of a multiple transmission reception point (MTRP), since the channel of PTRS and the channel of PDSCH are different, while the DMRSs sent by the two TRPs are the same, the power of the PTRS cannot be determined according to the number of layers.

In an embodiment, the power of the PTRS may be determined in one of following manners.

In manner 1, the power of the PTRS is obtained according to a relative power between the TRS1 and the TRS2, and specifically, the power of the PTRS is obtained by a power difference between the TRS and the PTRS. Because different TRPs may be configured with different TRSs, which is similar to the PTRS, the power of the PTRS may be associated with the TRS, and a power difference between the TRS and the PTRS is determined, so that the powers of different PTRS ports may be obtained.

In a manner 2, the serving node informs the power of the PTRS through fifth signaling. The fifth signaling may be RRC signaling, MAC CE signaling, or DCI signaling.

At a stage of R-15, the precoding of the PTRS and the precoding of the associated DMRS port are the same, but in the scenario of SFN of the MTRP, one DMRS port may correspond to different PTRSs port of different TRPs, and thus it cannot be satisfied that all of PTRS ports described above are the same as the precoding of the associated DMRS port. However, in this case, it may be considered that the precoding of different PTRS subjected to a linear combination according to a certain proportion is the same as the precoding of the associated DMRS port. The manner of combination described herein may be referred to any of the above embodiments.

Because the channel of the PTRS and the channel of the DMRS are different, a phase difference cannot be solved by uniting the DMRS and the PTRS, and for this reason, subcarriers of the PTRS and subcarriers of the DMRS need to be different, or the starting time domain symbol for the PTRS needs to be changed. Whether the subcarriers of the PTRS and the subcarriers of the DMRS need to be different or not is determined according to a number of time domain symbols occupied by the DMRS. If too many symbols occupied by the DMRS, the subcarriers of the PTRS and the subcarriers of the DMRS need to be different. That is, when the time domain density corresponding to each PTRS port is relatively large, for example, the time domain density is 1, PTRS of two ports cannot be placed at the same subcarrier position, and in this case, each PTRS port needs to occupy different subcarrier positions. Otherwise, in case that the number of time domain symbols occupied by the PTRS is relatively small, multiple PTRS ports may be placed at the same subcarrier position, and the subcarrier positions occupied by different PTRS ports may be the same.

In the scenario of SFN, different TRPs are configured with the same DMRS port, in a case where different TRPs are configured with different PTRS, while the PTRS ports corresponding to different TRPs need to be associated with the same DMRS port, the PTRS ports of different TRPs may occupy different subcarriers, or occupy the same subcarriers but occupy different time domain symbols.

Because the channel of the PTRS and the channel of the DMRS are different, the phase difference cannot be solved by uniting the DMRS and the PTRS, and for this reason, the subcarrier of PTRS and the subcarrier of DMRS need to be different, or the starting time domain symbol for the PTRS needs to be changed. Whether the subcarriers of the PTRS and the subcarriers of the DMRS need to be different or not is determined according to the number of the time domain symbols occupied by the DMRS. If the symbols occupied by the DMRS are too many, the subcarrier position of PTRS and the subcarrier position of DMRS need to be different, otherwise the subcarrier position of PTRS and the subcarrier position of DMRS can be the same.

In an embodiment, the frequency domain position of the PTRS may be determined according to the number of time domain symbols for a DMRS port associated with the PTRS.

Figure 6:
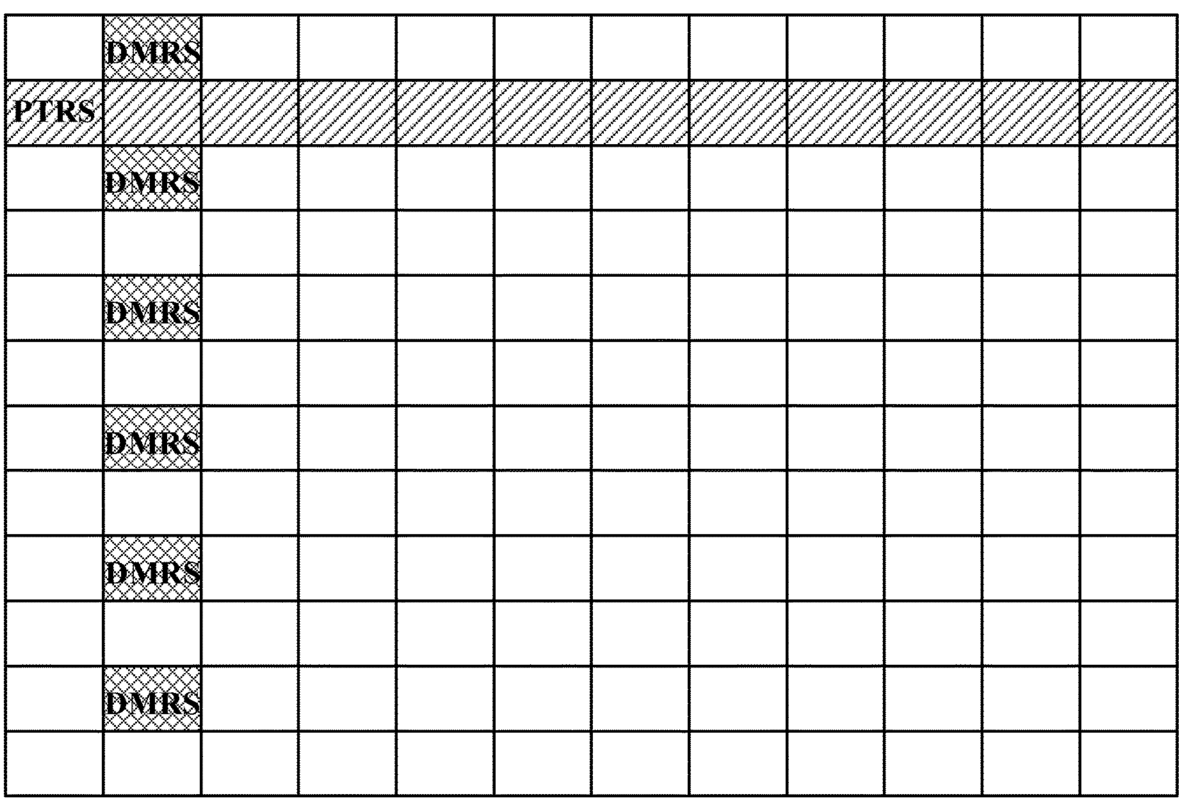
FIG. 6 is a schematic diagram of determining a frequency domain position of a PTRS according to the number of time domain symbols for a DMRS port provided in an embodiment.

FIG. 6 is a schematic diagram of determining a frequency domain position of a PTRS according to a number of time domain symbols for a DMRS port provided in an embodiment. As shown in FIG. 6, the frequency domain position of the PTRS (shown by diagonal hatching) may be determined according to the number of time domain symbols for the DMRS port (shown by diagonal grid hatching).

There is further provides a carrier frequency information determining method in an embodiment of the present application, and the terminal determines the association relationship between the SRS resource and the downlink reference signal resource according to the resource indication information sent by the serving node, so that the uplink carrier frequency information carried by the SRS resource is determined, and the reliability of determination of the carrier frequency information is improved. It should be noted that operations performed by the terminal in this embodiment correspond to specific operations performed by the serving node in any of the above-described embodiments, and technical details not described in detail in this embodiment may be referred to any of the above-described embodiments.

Figure 7:
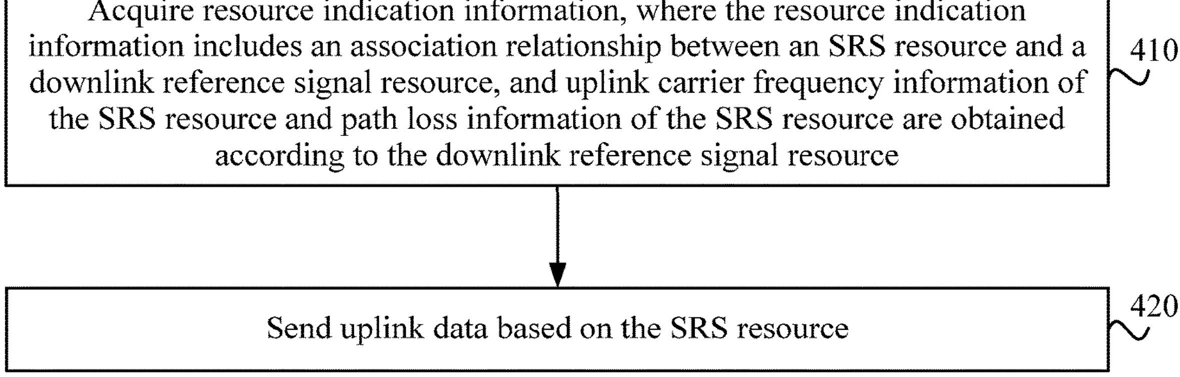
FIG. 7 is another flowchart of a carrier frequency information determining method provided in an embodiment.

FIG. 7 is another flowchart of a carrier frequency information determining method provided in an embodiment, and as shown in FIG. 7, the carrier frequency information determining method provided in this embodiment includes operation 410 and operation 420.

In operation 410, resource indication information is acquired, where the resource indication information includes an association relationship between an SRS resource and a downlink reference signal resource, and uplink carrier frequency information of the SRS resource and path loss information of the SRS resource are obtained according to the downlink reference signal resource.

In operation 420, uplink data is sent based on the SRS resource.

In an embodiment, the method further includes operation 411 in which, a path loss reference signal is received, where the uplink carrier frequency information is carried in the path loss reference signal.

In an embodiment, the method further includes operation 412 in which, an association relationship between a port for sending the path loss reference signal and the SRS resource indicated by the resource indication information is determined in a predefined or default manner.

Figure 8:
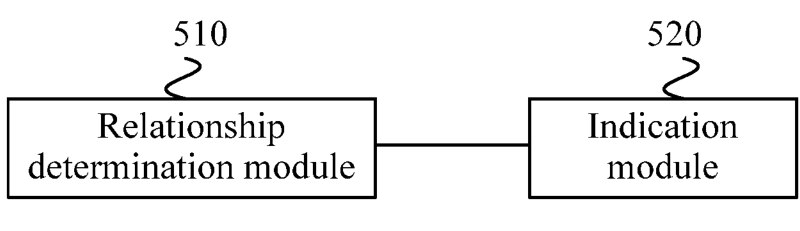
FIG. 8 is a schematic structural diagram of an information indication apparatus provided in an embodiment.

The embodiments of the present application further provide an information indication apparatus. FIG. 8 is a schematic structural diagram of an information indication apparatus provided in an embodiment. As shown in FIG. 8, the apparatus includes a relationship determination module 510 and an indication module 520.

The relationship determination module 510 is configured to determine a correspondence between a target antenna port and X antenna ports, where X is an integer greater than 1.

The indication module 520 is configured to send indication information to a terminal according to the correspondence, where the indication information is used for indicating that channel information of the target antenna port is obtained by combining channel information of the X antenna ports.

According to the information indication apparatus of this embodiment, the indication information is sent to indicate to the terminal that the channel information of the target antenna port may be obtained by combining the channel information of the other X antenna ports, so that a reliable basis is provided for determining the channel information of the target antenna port, the channel information is determined more flexibly, and further the reliability of the data transmission on the channel is improved.

In an embodiment, the target antenna port includes a target reference signal port; the X antenna ports include X reference signal ports, and the X reference signal ports correspond to X reference signal resources; channel information of the target reference signal port includes quasi-co-location parameters; and the indication information is used for indicating that the quasi-co-location parameters of the target reference signal port are obtained according to the X reference signal resources.

In an embodiment, the indication information is used for indicating that: quasi-co-location parameters of a first channel corresponding to the target reference signal port are obtained according to quasi-co-location parameters of a second channel corresponding to the X reference signal resources.

In an embodiment, a symbol for the target reference signal port is transmitted on the first channel.

In an embodiment, each reference signal resource of the X reference signal resources corresponds to one channel; the second channel satisfies one of: the second channel includes a combined channel of X channels corresponding to the X reference signal resources; or the second channel includes a weighted combined channel of X channels corresponding to the X reference signal resources.

In an embodiment, a symbol for a reference signal port corresponding to a respective reference signal resource is transmitted on a respective channel corresponding to the respective reference signal resource.

In an embodiment, in a case where the second channel includes the weighted combined channel of the X channels corresponding to the X reference signal resources, the second channel includes a combined channel obtained by multiplying each channel of the X channels by a respective weight factor and combining each channel multiplied by the respective weight factor. The respective weight factor corresponding to the each channel of the X channels is determined according to at least one of following information: first signaling, wherein the first signaling comprises the respective weight factor corresponding to the each channel of the X channels; a sending power ratio of the X channels corresponding to the X reference signal resources; a sending power ratio of the each reference signal resource of the X reference signal resources to a predetermined reference signal resource; or a sending power of the each reference signal resource of the X reference signal resources.

In an embodiment, the quasi-co-location parameters includes at least one of: a channel large scale characteristic, an average gain, an average delay, a delay spread, a Doppler shift, a Doppler spread, or a spatial receiving parameter.

In an embodiment, the first signaling includes at least one of: radio resource control (RRC) signaling; medium access control layer control element (MAC CE) signaling; or downlink control information (DCI) signaling.

In an embodiment, the indication module 520 is further configured to indicate that the second channel is obtained by weighting and combining a receiving power of each reference signal resource of the X reference signal resources.

In an embodiment, the reference signal includes at least one of: a demodulation reference signal, a tracking reference signal, a phase tracking reference signal, or a channel state indication reference signal.

The information indication apparatus in this embodiment is provided under the same concept as the information indication method proposed in the above-described embodiments, technical details not described in detail in this embodiment may be referred to any of the above-described embodiments, and the information indication apparatus in this embodiment has the same beneficial effects as the information indication method.

Figure 9:
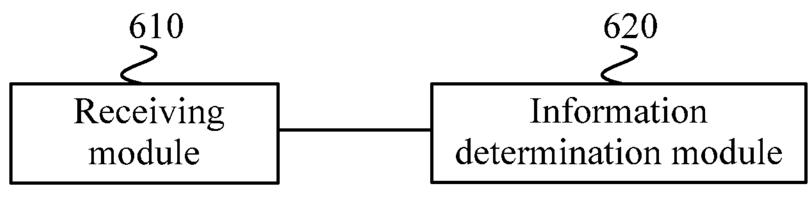
FIG. 9 is a schematic structural diagram of an information determination apparatus provided in an embodiment.

The embodiments of the present application further provide an information determination apparatus. FIG. 9 is a schematic structural diagram of an information determination apparatus provided in an embodiment. As shown in FIG. 9, the apparatus includes a receiving module 610 and an information determination module 620.

The receiving module 610 is configured to receive indication information, where the indication information is used for indicating that channel information of a target antenna port is obtained by combining channel information of X antenna ports, and X is an integer greater than 1.

The information determination module 620 is configured to determine the channel information of the target antenna port according to the indication information.

According to the information determination apparatus provided in this embodiment, the channel information of the X antenna ports is combined according to the indication information sent by the serving node to obtain the channel information of the target antenna port, so that the reliability of determining the channel information of the target antenna port is improved, the channel information is determined more flexibly, and further the reliability of the data transmission on the channel is improved.

In an embodiment, the target antenna port includes a target reference signal port; the X antenna ports include X reference signal ports, and the X reference signal ports correspond to X reference signal resources; channel information of the target reference signal port includes quasi-co-location parameters; and the indication information is used for indicating that the quasi-co-location parameters of the target reference signal port are obtained according to the X reference signal resources.

In an embodiment, the indication information is used for indicating that: quasi-co-location parameters of a first channel corresponding to the target reference signal port is obtained according to quasi-co-location parameters of a second channel corresponding to the X reference signal resources.

In an embodiment, a symbol for the target reference signal port is transmitted on the first channel; a symbol for a reference signal port corresponding to a respective reference signal resource is transmitted on a respective channel corresponding to the respective reference signal resource; each reference signal resource of the X reference signal resources corresponds to one channel; the second channel satisfies one of: the second channel includes a combined channel of X channels corresponding to the X reference signal resources; or the second channel includes a weighted combined channel of X channels corresponding to the X reference signal resources.

In an embodiment, the apparatus further includes a first channel combining module. The first channel combining module is configured to, in a case where the second channel includes the weighted combined channel of the X channels corresponding to the X reference signal resources, the second channel comprises a combined channel obtained by multiplying each channel of the X channels by a respective weight factor and combining each channel multiplied by the respective weight factor. The respective weight factor corresponding to the each channel of the X channels is determined according to at least one of following information: first signaling, wherein the first signaling comprises the respective weight factor corresponding to the each channel of the X channels; a sending power ratio of the X channels corresponding to the X reference signal resources; a sending power ratio of the each reference signal resource of the X reference signal resources to a predetermined reference signal resource; or a sending power of the each reference signal resource of the X reference signal resources.

In an embodiment, the apparatus further includes an acquisition manner determination module. The acquisition manner determination module is configured to: determine an acquisition manner of the weight factors according to the first signaling, where the first signaling includes at least one of: RRC signaling; MAC CE signaling; or DCI signaling; or determine an acquisition manner of the weight factor in a predefined or default manner.

In an embodiment, the apparatus further includes a second channel combining module. The second channel combining module is configured to obtain the second channel by weighting and combining a receiving power of each reference signal resource of the X reference signal resources.

In an embodiment, the quasi-co-location parameters includes at least one of: a channel large scale characteristic, an average gain, an average delay, a delay spread, a Doppler shift, a Doppler spread, or a spatial receiving parameter.

In an embodiment, the reference signal includes at least one of: a demodulation reference signal, a tracking reference signal, a phase tracking reference signal, or a channel state indication reference signal.

The information determination apparatus proposed in this embodiment belongs to the same concept as the information determining method proposed in the above-described embodiments, technical details not described in detail in this embodiment may be referred to any of the above-described embodiments, and this embodiment has the same beneficial effects as the information determining method.

Figure 10:
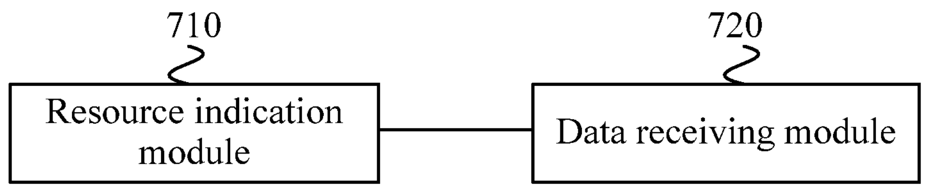
FIG. 10 is a schematic structural diagram of a carrier frequency information determination apparatus provided in an embodiment.

The embodiments of the present application further provide a carrier frequency information determination apparatus. FIG. 10 is a schematic structural diagram of a carrier frequency information determination apparatus provided in an embodiment. As shown in FIG. 10, the apparatus includes a resource indication module 710 and a data receiving module 720.

The resource indication module 710 is configured to send resource indication information to a terminal, where the resource indication information includes an association relationship between a sounding reference signal (SRS) resource and a downlink reference signal resource, and uplink carrier frequency information of the SRS resource and path loss information of the SRS resource are obtained according to the downlink reference signal resource.

The data receiving module 720 is configured to receive uplink data sent based on the SRS resource.

According to the carrier frequency information determination apparatus provided in this embodiment, the resource indication information is sent to the terminal to indicate the association relationship between the SRS resource and the downlink reference signal resource, so that the uplink carrier frequency information carried by the SRS resource can be determined, and the reliability of determining the carrier frequency information is improved.

In an embodiment, the apparatus further includes a path loss signal sending module. The path loss signal sending module is configured to send a path loss reference signal to the terminal, where the uplink carrier frequency information is carried in the path loss reference signal.

In an embodiment, the apparatus further includes a relationship configuration module. The relationship configuration module is configured to configure an association relationship in a predefined or default manner, where the association relationship includes an association relationship between a port for sending the path loss reference signal and the SRS resource indicated by the resource indication information.

In an embodiment, the apparatus further includes a TCI indication module. The TCI indication module is configured to: predefine a transmission configuration indication (TCI) state, where the TCI state is used for indicating that the DMRS port has a quasi-co-location relationship with combined information of channel information of multiple reference signals; and indicate a reference signal having the quasi-co-location relationship with the DMRS port to the terminal through a TCI domain in DCI signaling.

The carrier frequency information determination apparatus proposed in this embodiment belongs to the same concept as the carrier frequency information determining method applied to the serving node proposed in the above-described embodiments, technical details not described in detail in this embodiment may be referred to any of the above-described embodiments, and this embodiment has the same beneficial effects as the carrier frequency information determining method applied to the serving node.

Figure 11:
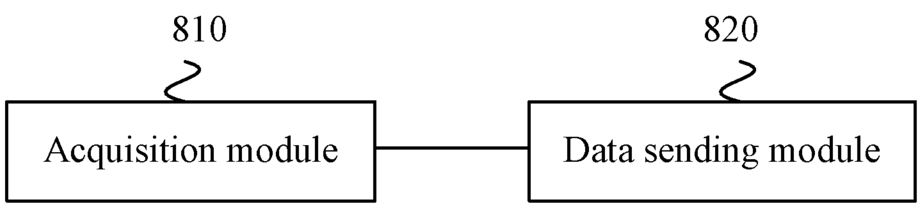
FIG. 11 is another schematic structural diagram of a carrier frequency information determination apparatus provided in an embodiment.

The embodiments of the present application further provide a carrier frequency information determination apparatus. FIG. 11 is another schematic structural diagram of a carrier frequency information determination apparatus provided in an embodiment. As shown in FIG. 11, the apparatus includes an acquisition module 810 and a data sending module 820.

The acquisition module 810 is configured to acquire resource indication information, where the resource indication information includes an association relationship between an SRS resource and a downlink reference signal resource, and uplink carrier frequency information of the SRS resource and path loss information of the SRS resource are obtained according to the downlink reference signal resource.

The data sending module 820 is configured to send uplink data sent based on the SRS resource.

According to the carrier frequency information determination apparatus provided in this embodiment, the association relationship between the SRS resource and the downlink reference signal resource is determined according to the resource indication information sent by the serving node, so that the uplink carrier frequency information carried by the SRS resource is determined, and the reliability of determining the carrier frequency information is improved.

In an embodiment, the apparatus further includes a path loss signal receiving module. The path loss signal receiving module is configured to receive a path loss reference signal, and the uplink carrier frequency information is carried in the path loss reference signal.

In an embodiment, the apparatus further includes a relationship determination module. The relationship determination module is configured to determine an association relationship between a port for sending the path loss reference signal and the SRS resource indicated by the resource indication information in a predefined or default manner.

In an embodiment, the apparatus further includes a TCI state determination module. The TCI state determination module is configured to: in a case where a predefined TCI state indicates that a DMRS port has a quasi-co-location relationship with combined information of channel information of multiple reference signals, receive DCI signaling, and determine a reference signal having the quasi-co-location relationship with the DMRS port according to a TCI domain in the DCI signaling.

The carrier frequency information determination apparatus proposed in this embodiment belongs to the same concept as the carrier frequency information determining method applied to the terminal proposed in the above-described embodiments, technical details not described in detail in this embodiment may be referred to any of the above-described embodiments, and this embodiment has the same beneficial effects as the carrier frequency information determining method applied to the terminal.

The embodiments of the present application further provide a communication node. The information indication method may be executed by an information indication apparatus, and the information indication apparatus may be implemented by software and/or hardware and is integrated in the communication node. Alternatively, the carrier frequency information determining method may be performed by a carrier frequency information determination apparatus, the carrier frequency information determination apparatus may be implemented by means of software and/or hardware, and is integrated in the communication node. The communication node is, for example, a serving node.

Figure 12:
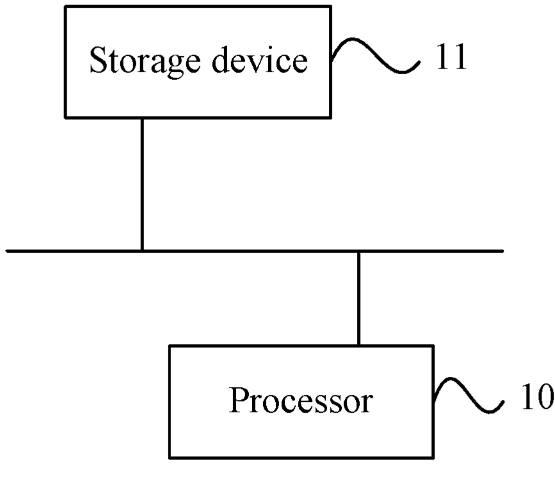
FIG. 12 is a schematic diagram of a hardware structure of a communication node provided in an embodiment.

FIG. 12 is a schematic diagram of a hardware structure of a communication node provided in an embodiment. As shown in FIG. 12, the communication node provided in this embodiment includes a processor 10 and a storage device 11. The number of processors 10 in the communication node may be one or more, and one processor 10 is taken as an example in FIG. 12. The processor 10 and the storage device 11 in the device may be connected via a bus or in other manners, and the processor 10 and the storage device 11 being connected via the bus is taken as an example in FIG. 12.

One or more programs are executed by the one or more processors 10 to cause the one or more processors to implement the information indication method or the carrier frequency information determining method applied to the serving node of any one of the above embodiments.

The storage device 11 in the communication node serves as a computer readable storage medium and may be configured to store one or more programs, and the programs may be a software program, a computer executable program and a module, such as a program instruction/module corresponding to the information indication method in the embodiments of the present disclosure (such as, the module in the information indication apparatus shown in FIG. 8, including the relationship determination module 510 and the indication module 520). The processor 10 executes various functional applications and data processing of the communication node, i.e., implements the information indication method or the carrier frequency information determining method applied to the serving node in the above-described method embodiments, by executing software programs, instructions, and modules stored in the storage device 11.

The storage device 11 mainly includes a program storage region and a data storage region, and the program storage region may store an operating system, an application program required for at least one function; the data storage region may store data and the like (such as, correspondence, instruction information in the above-described embodiment) created according to the use of the device. Moreover, the storage device 11 may include a high-speed random access memory and may also include a non-volatile memory, such as at least one magnetic disk storage device, flash memory device, or other non-volatile solid-state memory devices. In some instances, the storage device 11 may further include some memories remotely disposed with respect to the processor 10, these remote memories may be connected to the communication node over a network. Instances of such networks include, but are not limited to, an Internet, an intranet, a local area network, a mobile communication network, and combinations thereof.

Moreover, when the one or more programs included in the above-described communication node are executed by the one or more processors 10, following operations are implemented: a correspondence between a target antenna port and X antenna ports is determined, where X is an integer greater than 1; and indication information is sent to a terminal according to the correspondence, where the indication information is used for indicating that channel information of the target antenna port is obtained by combining channel information of the X antenna ports.

Alternatively, when the one or more programs included in the above-described communication node are executed by the one or more processors 10, following operations are implemented: resource indication information is sent to a terminal, where the resource indication information includes an association relationship between a sounding reference signal (SRS) resource and a downlink reference signal resource, and uplink carrier frequency information of the SRS resource and path loss information of the SRS resource are obtained according to the downlink reference signal resource; and uplink data sent based on the SRS resource is received.

The communication node proposed in this embodiment belongs to the same concept as the information indication method or the carrier frequency information determining method applied to the serving node proposed in the above embodiments. For technical details not described in detail in this embodiment, reference is made to any of the above embodiments, and this embodiment has the same beneficial effects as the execution of the information indication method or the carrier information determining method applied to the serving node.

The embodiments of the present application further provide a communication node. The information determining method may be executed by an information determination apparatus, and the information determination apparatus may be implemented by software and/or hardware and is integrated in the communication node. Alternatively, the carrier frequency information determining method may be performed by a carrier frequency information determination apparatus, the carrier frequency information determination apparatus may be implemented by means of software and/or hardware, and is integrated in the communication node. The communication node is, for example, a terminal.

Figure 13:
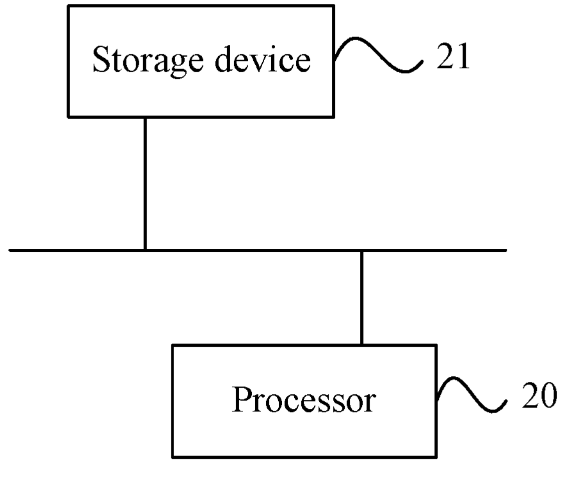
FIG. 13 is another schematic diagram of a hardware structure of a communication node provided in an embodiment.

FIG. 13 is another schematic diagram of a hardware structure of a communication node provided in an embodiment. As shown in FIG. 13, this embodiment provides a communication node, and the communication node includes a processor 20 and a storage device 21. The number of processors 20 in the communication node may be one or more, and one processor 20 is taken as an example in FIG. 13. The processor 20 and the storage device 21 may be connected via a bus or in other manners, and the processor 20 and the storage device 21 being connected by the bus is taken as an example in FIG. 13.

One or more programs are executed by the one or more processors 20 to cause the one or more processors to implement the information determining method or the carrier frequency information determining method applied to the terminal of any one of the above embodiments.

The storage device 21 in the communication nod serves as a computer-readable storage medium and may be configured to store one or more programs, and the program may be a software program, a computer executable program and a module, such as a program instruction/module corresponding to the information determining method in the embodiments of the present disclosure (such as, the module in the information determination apparatus shown in FIG. 9, including the receiving module 610 and the information determination module 620). The processor 20 executes various functional applications and data processing of the communication node, i.e., implements the information determining method or the carrier frequency information determining method applied to the terminal in the above-described method embodiments, by executing software programs, instructions, and modules stored in the storage device 21.

The storage device 21 mainly includes a program storage region and a data storage region, and the program storage region may store an operating system, an application program required for at least one function; the data storage region may store data and the like (such as, correspondence, indication information in the above-described embodiments) created according to the use of the device. Moreover, the storage device 21 may include a high-speed random access memory and may also include a non-volatile memory, such as at least one magnetic disk storage device, flash memory device, or other non-volatile solid-state memory devices. In some instances, the storage device 21 may further include some memories remotely disposed with respect to the processor 20, these remote memories may be connected to the communication node over a network. Instances of such networks include, but are not limited to, an Internet, an intranet, a local area network, a mobile communication network, and combinations thereof.

Moreover, when the one or more programs included in the above-described communication node are executed by the one or more processors 20, following operations are implemented: indication information is received, where the indication information is used for indicating that channel information of a target antenna port is obtained by combining channel information of X antenna ports, and X is an integer greater than 1; and the channel information of the target antenna port is determined according to the indication information.

Alternatively, when the one or more programs included in the above-described communication node are executed by the one or more processors 20, following operations are implemented: resource indication information is acquired, where the resource indication information includes an association relationship between a sounding reference signal (SRS) resource and a downlink reference signal resource, and uplink carrier frequency information of the SRS resource and path loss information of the SRS resource are obtained according to the downlink reference signal resource; and uplink data is sent based on the SRS resource.

The communication node in this embodiment is provided under the same concept as the information determining method or the carrier frequency information determining method applied to the terminal proposed in the above embodiments. For technical details not described in detail in this embodiment, reference may be made to any of the above embodiments, and the communication node in this embodiment has the same beneficial effects as the information indication method or the carrier information determining method applied to the terminal.

The embodiments of the present application further provide a non-transitory storage medium including computer-executable instructions, the computer-executable instructions, when executed by a computer processor, are configured to perform the information indication method including: a correspondence between a target antenna port and X antenna ports is determined, where X is an integer greater than 1; and indication information is sent to a terminal according to the correspondence, where the indication information is used for indicating that channel information of the target antenna port is obtained by combining channel information of the X antenna ports.

Alternatively, the computer-executable instructions, when executed by a computer processor, are configured to perform the information determining method including that: indication information is received, where the indication information is used for indicating that channel information of a target antenna port is obtained by combining channel information of X antenna ports, and X is an integer greater than 1; and the channel information of the target antenna port is determined according to the indication information.

Alternatively, the computer-executable instructions, when being executed by a computer processor, are configured to perform the carrier frequency information determining method including that: resource indication information is sent to a terminal, where the resource indication information includes an association relationship between a sounding reference signal (SRS) resource and a downlink reference signal resource, and uplink carrier frequency information of the SRS resource and path loss information of the SRS resource are obtained according to the downlink reference signal resource; and uplink data sent based on the SRS resource is received.

Alternatively, when the computer-executable instructions, when being executed by a computer processor, are configured to perform the carrier frequency information determining method including that: resource indication information is acquired, where the resource indication information includes an association relationship between a sounding reference signal (SRS) resource and a downlink reference signal resource, and uplink carrier frequency information of the SRS resource and path loss information of the SRS resource are obtained according to the downlink reference signal resource; and uplink data is sent based on the SRS resource.

Those skilled in the art will appreciate from the above description of the implementation manners that the present application may be implemented by means of software and general purpose hardware, and may also be implemented by hardware. Based on this understanding, the technical scheme of the present application may be embodied in the form of a software product, and the computer software product may be stored in a non-transitory computer readable storage medium, such as a floppy disk of a computer, a read-only memory (ROM), a random access memory (RAM), a flash memory (FLASH), a hard disk or an optional disk, including multiple instructions to enable a computer device (which may be a personal computer, a server, or a network device, etc.) to perform the method of any of the embodiments of the present application.

The above description is merely an exemplary embodiment of the present application, and is not intended to limit the scope of protection of the present application.

Any block diagram of the logic flow in the accompanying drawings of the present application may represent program processes, or may represent interconnected logic circuits, modules, and functions, or may represent a combination of program processes and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), etc. The computer readable medium may include a non-instantaneous storage medium. The data processor may be of any type suitable for the local technical environment, such as, but not limited to, a general-purpose computer, a specialized computer, a microprocessor, a digital signal processor (DSP), an application specific integrated circuit (ASIC), a field programmable gate array (FPGA), and a processor based on a multi-core processor architecture.

What is claimed is:

1. An information indication method, applied to a serving node, comprising:

determining a correspondence between a target antenna port and X antenna ports, wherein X is an integer greater than 1, the target antenna port comprises a target reference signal port, channel information of the target reference signal port comprises quasi-co-location parameters, the X antenna ports comprise X reference signal ports, and the X reference signal ports correspond to X reference signal resources; and sending indication information to a terminal according to the correspondence, wherein the indication information is used for indicating that channel information of the target antenna port is obtained by combining channel information of the X antenna ports comprising that the indication information is used for indicating that the quasi-co-location parameters of the target reference signal port are obtained according to the X reference signal resources;

wherein that the indication information is used for indicating that the quasi-co-location parameters of the target reference signal port are obtained according to the X reference signal resources comprises:

the indication information is used for indicating that quasi-co-location parameters of a first channel corresponding to the target reference signal port are obtained according to quasi-co-location parameters of a second channel corresponding to the X reference signal resources;

wherein the second channel satisfies one of that:

the second channel comprises a combined channel of X channels corresponding to the X reference signal resources; or the second channel comprises a weighted combined channel of X channels corresponding to the X reference signal resources;

wherein the second channel comprises the weighted combined channel of the X channels corresponding to the X reference signal resources, the weighted combined channel is obtained by multiplying each of the X channels by a respective weight factor to obtain X weighted channels and combining the X weighted channels, and the indication information is further used for indicating that the second channel is obtained by weighting and combining a receiving power of each of the X reference signal resources;

wherein the respective weight factor corresponding to each of the X channels is determined according to at least one of following information:

first signaling, wherein the first signaling comprises the respective weight factor corresponding to each of the X channels, wherein the first signaling comprises at least one of: radio resource control (RRC) signaling; medium access control layer control element (MAC CE) signaling; or downlink control information (DCI) signaling;

a sending power ratio of the X channels corresponding to the X reference signal resources;

a sending power ratio of each of the X reference signal resources to a predetermined reference signal resource; or a sending power of each of the X reference signal resources;

wherein in a Single Frequency Network (SFN) scenario, the target reference signal port comprises at least one demodulation reference signal (DMRS) port, and the X reference signal ports corresponding to at least two tracking reference signal (TRS) ports; and wherein the first signaling comprises a plurality of bits, each of the plurality of bits corresponds to a weight factor of the X channels, and the weight factor is associated with a number of antenna ports corresponding to the X reference signal ports or a bit size of the first signaling.

2. The method of claim 1, wherein the quasi-co-location parameters comprises at least one of: a channel large scale characteristic, an average gain, an average delay, a delay spread, a Doppler shift, a Doppler spread, or a spatial receiving parameter; and wherein a reference signal comprises at least one of: a DMRS, a tracking reference signal, a phase tracking reference signal, or a channel state indication reference signal.

3. The method of claim 1, wherein a symbol for the target reference signal port is transmitted on the first channel.

4. The method of claim 1, wherein each of the X reference signal resources corresponds to one channel, and a symbol for a reference signal port corresponding to a respective reference signal resource is transmitted on a respective channel corresponding to the respective reference signal resource.

5. A communication node comprising:

one or more processors;

a storage device, which is configured to store one or more programs;

wherein the one or more programs, when executed by the one or more processors, cause the one or more processors to implement the information indication method of claim 1.

6. A non-transitory computer-readable storage medium, storing a computer program, wherein the computer program, when executed by a processor, implements the information indication method of claim 1.

7. The method of claim 2, wherein the method further comprises:

predefining a transmission configuration indication (TCI) state, wherein the TCI state is used for indicating that the DMRS port has a quasi-co-location relationship with combined information of channel information of a plurality of reference signals; and indicating the plurality of reference signals having the quasi-co-location relationship with the DMRS port to the terminal through a TCI domain in DCI signaling.

8. An information determining method, applied to a terminal, comprising:

receiving indication information, wherein the indication information is used for indicating that channel information of a target antenna port is obtained by combining channel information of X antenna ports, and X is an integer greater than 1, the target antenna port comprises a target reference signal port, channel information of the target reference signal port comprises quasi-co-location parameters, the X antenna ports comprise X reference signal ports, and the X reference signal ports correspond to X reference signal resources; and determining the channel information of the target antenna port according to the indication information; wherein the indication information is used for indicating that channel information of the target antenna port is obtained by combining channel information of the X antenna ports comprising that the indication information is used for indicating that the quasi-co-location parameters of the target reference signal port are obtained according to the X reference signal resources;

wherein that the indication information is used for indicating that the quasi-co-location parameters of the target reference signal port are obtained according to the X reference signal resources comprises:

the indication information is used for indicating that quasi-co-location parameters of a first channel corresponding to the target reference signal port are obtained according to quasi-co-location parameters of a second channel corresponding to the X reference signal resources;

wherein the second channel satisfies one of that:

the second channel comprises a combined channel of X channels corresponding to the X reference signal resources; or the second channel comprises a weighted combined channel of X channels corresponding to the X reference signal resources;

wherein the second channel comprises the weighted combined channel of the X channels corresponding to the X reference signal resources, the weighted combined channel is obtained by multiplying each of the X channels by a respective weight factor to obtain X weighted channels and combining the X weighted channels, and the indication information is further used for indicating that the second channel is obtained by weighting and combining a receiving power of each of the X reference signal resources;

wherein the respective weight factor corresponding to each of the X channels is determined according to at least one of following information:

first signaling, wherein the first signaling comprises the respective weight factor corresponding to each of the X channels, wherein the first signaling comprises at least one of: radio resource control (RRC) signaling; medium access control layer control element (MAC CE) signaling; or downlink control information (DCI) signaling;

a sending power ratio of the X channels corresponding to the X reference signal resources;

a sending power ratio of each of the X reference signal resources to a predetermined reference signal resource; or a sending power of each of the X reference signal resources;

wherein in a Single Frequency Network (SFN) scenario, the target reference signal port comprises at least one demodulation reference signal (DMRS) port, and the X reference signal ports correspond to at least two tracking reference signal (TRS) ports; and wherein the first signaling comprises a plurality of bits, each of the plurality of bits corresponds to a weight factor of the X channels, and the weight factor is associated with a number of antenna ports corresponding to the X reference signal ports or a bit size of the first signaling.

9. The method of claim 8, wherein, a reference signal comprises at least one of: a DMRS, a tracking reference signal, a phase tracking reference signal, or a channel state indication reference signal; and wherein the quasi-co-location parameters comprises at least one of: a channel large scale characteristic, an average gain, an average delay, a delay spread, a Doppler shift, a Doppler spread, or a spatial receiving parameter.

10. The method of claim 8, wherein, a symbol for the target reference signal port is transmitted on the first channel;

a symbol for a reference signal port corresponding to a respective reference signal resource is transmitted on a respective channel corresponding to the respective reference signal resource;

each of the X reference signal resources corresponds to one channel.

11. The method of claim 8, further comprising:

determining an acquisition manner of the respective weight factor according to the first signaling, wherein the first signaling comprises at least one of: radio resource control (RRC) signaling; medium access control layer control element (MAC CE) signaling; or downlink control information (DCI) signaling; or determining an acquisition manner of the respective weight factor in a predefined or default manner.

12. A terminal comprising:

one or more processors;

a storage device, which is configured to store one or more programs;

wherein the one or more programs, when executed by the one or more processors, cause the one or more processors to implement the information determining method of claim 8.

13. A non-transitory computer-readable storage medium, storing a computer program, wherein the computer program, when executed by a processor, implements the information determining method of claim 8.

14. The method of claim 9, wherein a predefined transmission configuration indication (TCI) state indicates that a DMRS port has a quasi-co-location relationship with combined information of channel information of a plurality of reference signals, and the method further comprises:

receiving DCI signaling, and determining a reference signal having the quasi-co-location relationship with the DMRS port according to a TCI domain in the DCI signaling.

* * * * *